United States Patent Office 2,999,074
Patented Sept. 5, 1961

2,999,074
CATALYST COMPOSITIONS
Herman S. Bloch, Skokie, and Vladimir Haensel, Hinsdale, Ill., assignors, by mesne assignments, to Universal Oil Products Company, Des Plaines, Ill., a corporation of Delaware
No Drawing. Filed Sept. 11, 1956, Ser. No. 609,089
14 Claims. (Cl. 252—442)

This invention relates to novel compositions of matter and particularly to novel catalyst compositions which are of special utility in catalyzing reactions of organic compounds and particularly of hydrocarbons.

While the compositions of the present invention include reaction products of metal halides of the Friedel-Crafts type, the compositions possess catalytic properties superior to those of metal halides of the Friedel-Crafts type. These superior properties apparently result from a peculiar association of the reaction product of a metal halide of the Friedel-Crafts type and the other components of the composition. It will be seen from the examples appended to the specification that the composition of the present invention is a different catalyst than is a metal halide of the Friedel-Crafts type such as aluminum chloride and as another distinction the products formed in reactions catalyzed by the composition of the present invention are different from those obtained in the presence of metal halides of the Friedel-Crafts type under comparable conditions. These differences are particularly apparent in comparison with catalysts comprising metal halides of the Friedel-Crafts type when utilized in conjunction with hydrogen halides as has usually been the case.

In one embodiment, the present invention relates to a novel composition of matter prepared by reacting a Friedel-Crafts metal halide with a refractory oxide containing chemically combined hydroxyl groups which has previously been composited with a platinum-group metal and calcined, said reaction resulting in the elimination from the composite of at least 0.5 mol but not more than 2.0 mols of hydrogen halide per mol of Friedel-Crafts metal halide adsorbed thereon.

In another embodiment, the present invention relates to a novel composition of matter prepared by reacting a Friedel-Crafts aluminum halide with a refractory metal oxide containing chemically combined hydroxyl groups which has previously been composited with platinum and calcined, said reaction resulting in the elimination from the composite of at least 0.5 mol but not more than 2.0 mols of hydrogen halide per mol of Friedel-Crafts aluminum halide adsorbed thereon.

In a specific embodiment, the present invention relates to a novel composition of matter prepared by reacting aluminum chloride with alumina containing chemically combined hydroxyl groups which has previously been composited with platinum and calcined, said reaction resulting in the elimination from the composite of at least 0.5 mol but not more than 2.0 mols of hydrogen chloride per mol of aluminum chloride adsorbed thereon.

In another specific embodiment, the present invention relates to a composition of matter comprising platinum, aluminum chloride and alumina normally containing chemically combined hydroxyl groups, in which composition the aluminum chloride has been reacted with said hydroxyl groups with the resultant elimination of from about 0.5 mol to about 2.0 mols of hydrogen chloride per mol of aluminum chloride adsorbed thereon and with the formation of >Al—O—AlCl$_2$ active centers.

As hereinabove set forth, the novel composition includes a refractory oxide, a platinum group metal, and the reaction product of a metal halide of the Friedel-Crafts type with residual hydroxyl groups on the surface of said refractory oxide. Thus, the refractory oxide will be of a type familiar for use in the preparation of catalytic substances for hydrocarbon conversion reactions and will contain hydroxyl groups distributed over the surface thereof, said surface preferably comprising a rather large area, for example, from about 50 to about 1000 square meters per gram. The refractory oxide is a solid and may be selected from diverse high surface area oxides which are not necessarily equivalent as supports for use in preparing the novel compositions of matter of the invention. Among suitable refractory oxides are various substances such as silica (a non-metallic refractory oxide), and various refractory metal oxides such as alumina, titanium dioxide, zirconium dioxide, chromia, zinc oxide, silica-alumina, chromia-alumina, alumina-boria, silica-zirconia, silica-alumina-magnesia, silica-alumina-zirconia, etc., and various naturally occurring refractory oxides of differing degrees of purity such as bauxite, kaolin or clay, which may or may not have been previously acid treated, diatomaceous earth such as kieselguhr, montmorillonite, spinels such as magnesium oxide-alumina spinels or zinc oxide spinels, crushed fire brick, etc. Of the above-mentioned refractory oxides alumina is preferred, and particularly preferred is synthetically prepared gamma-alumina of a high degree of purity.

All of these above-mentioned refractory oxides whether synthetically prepared or whether naturally occurring contain both chemically combined and physically adsorbed water. By various well-known techniques such as drying and/or calcination, the water content of these refractory oxides can be lowered and minimized while at the same time a surface can be developed which surface is useful either by itself or in combination with other materials as a site for accelerating reactions subject to catalysis. It is also well known that excessive temperatures can destroy these surfaces and thus must be avoided. In the drying and/or calcination of a suitable refractory oxide, such as alumina, the physically adsorbed water is first removed therefrom. Then, at still higher temperatures, chemically combined hydroxyl groups begin to escape from the surface. This is accomplished by the combination of two hydroxyl groups, for example, to form one molecule of water and a new oxide bond. In the case of alumina, the complete elimination of chemically combined hydroxyl groups from the surface thereof results under conditions of conversion to the well known alpha-alumina form which is inert as a catalyst support. This inertness has previously been attributed to the low surface area of alpha-alumina but it is now considered to be additionally related to the loss of chemically combined hydroxyl groups. Thus, as set forth hereinabove, while many refractory oxides are suitable for supports of the present invention, these refractory oxides are characterized by the presence on the surface thereof of chemically combined hydroxyl groups. The presence of such chemically combined hydroxyl groups can be determined by treatment of these refractory oxides after drying and/or calcination with anhydrous hydrogen chloride which tends to react with said hydroxyl groups with the elimination of water and the substitution of chlorine for hydroxyl. The chlorine content of such refractory oxides can be readily determined by known analytical techniques and this chlorine content can thus be specified as equal to the hydroxyl equivalents on the surface of said refractory oxides.

In the novel compositions of matter of the present invention the above-mentioned refractory oxides have composited therewith a platinum-group metal, and the composites are calcined prior to the reaction of a metal halide of the Friedel-Crafts type therewith. By a platinum-group metal is meant a noble metal, excluding silver and gold, and selected from platinum, palladium, ruthenium, rhodium, osmium, and iridium. These platinum group metals may be composited with the above-mentioned refractory oxides in any desired manner such as by impregnation, coprecipitation, etc. Impregnation techniques are well known and in one such method a compound of the desired platinum group metal is dissolved in a suitable solvent and the refractory oxide contacted therewith, followed by drying, and calcination. When synthetically prepared refractory oxides of high degrees of purity are utilized, it is sometimes desirable or preferable to coprecipitate the platinum group metal along with the refractory oxide. Following such coprecipitation, the resultant composite is dried and calcined. Of the metals set forth hereinabove which may be composited with a refractory oxide prior to reaction thereof with a metal halide of the Friedel-Crafts type, platinum and palladium are preferred and particularly platinum is preferred. The platinum group metals are not necessarily equivalent in activity as catalysts in the composites of the present invention and therefore the selection of any one or more will be based upon the use of such compositions of matter. As hereinabove described, the composite of platinum group metal and refractory oxide, prepared by impregnation, coprecipitation, etc. is next dried and calcined. This calcination is normally carried out under carefully controlled conditions to remove therefrom physically adsorbed solvents such as water but under sufficiently mild conditions so that chemically combined hydroxyl groups are not eliminated or lost. Temperatures ranging from about 350° C. to about 700° C. are usually satisfactory. As stated previously, the presence of these chemically combined hydroxyl groups in such platinum-group metal refractory oxide composites is a necessary prerequisite for the preparation of the novel compositions of matter herein described.

After the platinum group metal has been composited with the refractory oxide, and after said composite has been calcined, the chemically combined hydroxyl groups on the surface thereof are reacted with a metal halide of the Friedel-Crafts type. Suitable metal halides of the Friedel-Crafts type include aluminum chloride, aluminum bromide, ferric chloride, ferric bromide, zinc chloride, beryllium chloride, gallium chloride, titanium tetrachloride, zirconium chloride, stannic chloride, etc. Of these metal halides of the Friedel-Crafts type, the aluminum halides are preferred, and of the aluminum halides, aluminum chloride is particularly preferred. Furthermore, these metal halides are not necessarily equivalent when utilized in forming the novel compositions of matter of the present invention and during the use of these compositions as catalysts as will be set forth hereinafter.

The preferred catalyst composition comprises an alumina platinum composite, which composite has had the chemically combined hydroxyl groups on the surface thereof reacted with aluminum chloride. As stated hereinabove, the alumina is preferably synthetically prepared gamma-alumina of a high degree of purity. The methods of preparation of such synthetically prepared gamma-aluminas are well known. for example, they may be prepared by calcination of alumina gels which are commonly formed by adding a suitable reagent, such as ammonium hydroxide, ammonium carbonate, etc., to a salt of aluminum such as aluminum chloride, aluminum sulfate, aluminum nitrate, etc., in an amount to form aluminum hydroxide which upon drying and calcination is converted to gamma-alumina. It has been found that aluminum chloride is generally preferred as the aluminum salt, not only for convenience in subsequent washing and filtering procedures, but also because it appears to give the best results. Alumina gels may also be prepared by the reaction of sodium aluminate with a suitable acidic reagent to cause precipitation thereof with the resultant formation of an aluminum hydroxide gel. Synthetic aluminas may also be prepared by the formation of alumina sols, for example, by the reaction of metallic aluminum with hydrochloric acid, which sols can be gelled by suitable precipitation agents such as ammonium hydroxide, followed by drying and calcination. In an additional embodiment of this invention, these aluminas may contain from about 0.01 to about 8% combined halogen, based on the weight of the dry alumina, the combined halogen preferably being fluorine. However, the amount of combined halogen, particularly fluorine, is kept within the lower limits of the above-described range since the combined halogen substitutes to some degree for hydroxyl groups which later on will appear on the catalyst surface for reaction with the metal halide of the Friedel-Crafts type. Therefore, if the amount of combined halogen is substantial, the amount of chemically combined free hydroxyl groups will be relatively low and maximum catalyst activity development will be precluded since extensive reaction between a metal halide of the Friedel-Crafts type and such hydroxyl groups is thereby prevented. These halogenated aluminas may be prepared in various manners, for example, by the addition of a suitable quantity of hydrofluoric acid to an alumina gel prior to drying and calcination thereof. In another manner, aluminum fluoride can be added to alumina gels thus yielding an alumina having the desired quantity of fluoride combined therewith. When the synthetically prepared alumina is prepared from aluminum chloride, it is sometimes advantageous or desirable to minimize the washings thereof to retain a desired amount of chlorine composited with the alumina. In any of the above instances wherein the alumina is prepared from an alumina sol or an alumina gel, the resultant product is calcined to a sufficient temperature to convert the alumina product into gamma-alumina of high surface area. Such calcinations are normally carried out at temperatures of from about 350° C. to about 700° C. and preferably at temperatures of from about 500° C. to about 600° C. The resultant gama-aluminas prepared in this manner will contain small quantities of physically adsorbed water of hydration but the calcination temperatures are beneath those wherein substantially all chemically combined hydroxyl groups are converted to water and to oxide linkages. Since such resultant aluminas are desiccants, if they are to be stored, the storage should be carried out in a dry atmosphere to preclude readsorption of water thereon.

However, in many instances the thus prepared and calcined alumina is composited with an aqueous solution of a compound of a platinum group metal. In such cases it is not only necessary to re-calcine the above-described alumina to develop maximum surface area thereon but further calcination becomes necessary to remove physically adsorbed water which has been introduced during the platinum impregnation step. The platinum group metal, particularly platinum, can be composited with the alumina in any of many well known methods. For example, an ammoniacal solution of chloroplatinic acid may be admixed with alumina followed by drying, calcination, and reduction. In another method, chloroplatinic acid in the desired quantity can be added to an alumina gel slurry followed by precipitation of the platinum therefrom on the alumina by means of hydrogen sulfide or other sulfiding agents. In still another method, the platinum may be coprecipitated with the alumina gel, for example, by introduction of a suitable platinum compound into an alumina sol followed by or simultaneously with the addition of precipitation agent. While the quantity of platinum compounded with the alumina is not critical, for economic reasons it is usually kept at a minimum. Thus, large amounts of platinum do not cause a detrimental effect. However, it is generally preferred to utilize from about 0.01 to about 2% by weight of platinum based on the dry alumina.

While the form of the platinum-group metal refractory oxide composite is not critical, it is generally preferred to utilize macro size particles so that the total composite may be utilized as a fixed bed in a reaction zone. Thus, it is desirable to form the synthetically prepared alumina either before or after the platinum-group metal is composited therewith into pellets, for example, of $\frac{1}{16}$ by $\frac{1}{16}$ inch, or ⅛ by ⅛ inch, etc. Alternatively, the particles may be in the form of spheres or irregularly shaped pieces such as result from extrusion. The pellets may be formed in one method by grinding the dried alumin gel to a powder followed by pilling thereof by known methods. While it is not meant to limit the invention to particles of any particular size, the above-mentioned alumina-platinum composites are definitely preferred. These composites of platinum-group metals and refractory oxides, for example, platinum and alumina, are somewhat hygroscopic and it is usually necessary to store them in or under an atmosphere of reduced humidity. However, when the metal halide of the Friedel-Crafts type such as aluminum chloride is composited therewith immediately after preparation, drying and calcination, no such precaution is necessary.

It is preferred to impregnate the synthetically prepared alumina-platinum composites with aluminum chloride to form the desired compositions of matter of the present invention. This can be accomplished readily by the sublimation of the aluminum chloride onto the surface of the particles of platinum-alumina composite under conditions of reaction of the thus sublimed aluminum chloride with the chemically combined hydroxyl groups on the surface of said composite. This reaction is accompanied by the elimination of from about 0.5 to about 2.0 mols of hydrogen chloride per mol of aluminum chloride adsorbed thereon. If more or less hydrogen chloride is evolved, insufficient active centers are present. Aluminum chloride sublimes at about 183° C. and thus a suitable impregnation temperature will range from about 190° C. to about 350° C. While the sublimation temperatures preferred are normally in the lower portion of the above-indicated range, better reaction is obtained in the upper portion of said range. Compromise temperatures are normally utilized, that is, temperatures ranging from about 250° C. to about 300° C. This sublimation can be carried out under pressure if desired and also in the presence of diluents such as inert gases, hydrogen, and paraffinic hydrocarbons. Since hydrogen chloride is eliminated, it is preferable to utilize atmospheric pressure although higher pressures may be used in some instances. The amount of metal halide of the Friedel-Crafts type normally admixed with the synthetically prepared alumina-platinum composites may range from about 10% to about 100% by weight based on the weight of the refractory oxide-platinum group metal composite prior to impregnation. Not all of the metal halide will necessarily react, however, the amount reacting being determined by the equivalents of hydroxyl groups on the surface of the refractory oxide. The final composite is then separated from any unreacted metal halide of the Friedel-Crafts type. The reaction of aluminum chloride with the hydroxyl groups on the surface of the refractory oxide platinum group metal yields >Al—O—AlCl$_2$ active centers. Because of the particular structure these active centers are very active catalyst components. Furthermore, it is thought that the high activity and unusual catalytic properties of the present compositions of matter are due to the peculiar association of such active centers with the platinum group metal and with the base composite. One unusual feature of the present compositions of matter is that they may be utilized as catalysts for reactions in which it has heretofore been considered necessary to utilize hydrogen halide promoters. For example, it has usually been considered necessary to utilize hydrogen chloride along with aluminum chloride for the isomerization of n-butane to isobutane. While the use of hydrogen halide promoters with the catalyst compositions of the present invention is not meant to be excluded, it has been found unnecessary to utilize such promoters to obtain catalysis with these compositions. n-Butane can be satisfactorily isomerized to isobutane in the presence of the compositions of the present invention and in the absence of hydrogen chloride. Furthermore, satisfactory isomerization of n-hexane isomers has not been accomplished by prior art methods without the concurrent cracking reactions taking place in large quantities. In the presence of the novel compositions of matter of this invention, n-hexane can be isomerized to hexane isomers in high yields and with the substantial absence of cracking.

The catalyst composition of the present invention may be utilized for effecting various reactions of organic compounds and particularly of hydrocarbons. These reactions include (A) condensation reactions in which two molecules, which may be the same or different, will condense to form a larger size molecule, (B) destructive reactions in which a molecule is decomposed into a smaller size molecule or into two or more molecules, (C) rearrangement reactions as, for example, isomerization, (D) disproportionation reactions in which a radical is transferred from one molecule to another, (E) hydrogenation reactions, and (F) other reactions. Among these reactions are (1) polymerization of olefins and particularly of ethylene, propylene, 1-butene, 2-butene, isobutylene, amylenes, and higher boiling olefins and mixtures thereof, (2) alkylation of isoparaffins with olefins or other alkylating agents including, for example, alkyl halides, etc., and particularly the alkylation of isobutane, isopentane, and/or isohexane with ethylene, propylene, 1-butene, 2-butene, isobutylene, amylenes, etc., or mixtures thereof, (3) alkylation of aromatics with olefins or other alkylating agents, and particularly the alkylation of benzene, toluene, etc., with propylene, butylenes, amylenes, and also higher boiling olefins such as nonenes, decenes, undecenes, dodecenes, tridecenes, tetradecenes, pentadecenes, etc. or mixtures thereof, (4) isomerization of paraffins and particularly of n-butane, n-pentane, n-hexane, n-heptane, n-octane, etc., or mixtures thereof, including isomerization of partially branched chain paraffins to more highly branched chain paraffins such as the isomerization of 2-methyl- and 3-methylpentane to 2,2-dimethylbutane and 2,3-dimethylbutane, (5) isomerization of naphthenes as, for example, isomerization of methylcyclopentane to cyclohexane, isomerization of dimethylcyclopentane to methylcyclohexane, (6) alkylation of phenols or thiophenols with olefins or other alkylating agents, (7) alkylation of thiophenes with olefins, (8) hydrogen transfer reactions, (9) alkyl transfer reactions, (10) dealkylation reactions, (11) reforming of gasolines or naphtha to improve the anti-knock characteristics thereof, (12) destructive hydrogenation reactions, (13) cracking of oil heavier than gasoline into lower boiling products and particularly gasoline, including hydrocracking under hydrogen pressure, (14) hydrogenation reactions in which an unsaturated compound is hydrogenated to a more saturated compound as, for example, the hydrogenation of diolefins to olefins, olefins to paraffins, cycloolefins to naphthenes, etc., and (15) other reactions of hydrocarbons and organic compounds. The operating conditions to be employed will depend upon the particular reaction and generally will be at relatively low temperatures, although higher temperatures may be employed, particularly at atmospheric pressure. Thus, the temperature may range from 0° C. or less to 300° C. or more, preferably from 25° C. to 250° C. and the pressure may range from atmospheric to 5000 lbs. per square inch or more, preferably from 50 p.s.i. to about 1000 p.s.i. Hydrogen may be employed when required or of advantage. We believe that hydrogen in controlled amounts may play an important role in suppressing sludge formation and in promoting many of the reactions discussed hereinabove. While the use of hydrogen in any of the above set forth reactions has been disclosed in the prior art in conjunction with other catalysts, it is felt that hydrogen may be a much more important factor along with the novel catalyst composition of the present invention. Small amounts of sulfur in the feed stocks employed may be tolerated without harmful effects on the present catalyst.

The process may be effected in any suitable manner, which will not only depend upon the particular reaction but also upon the form in which the catalyst is used. Since the catalyst is utilized as a solid mass, it may be disposed as a fixed bed in a reaction zone, and the reactants are supplied thereto in any suitable manner. Reactants may be passed either in upward flow or downflow through the catalyst bed. In another method, the catalyst may be utilized in a so-called fluidized fixed bed type of operation in which the catalyst is maintained in a turbulent state by passage of the reactants therethrough. In another method of operation, the catalyst may be utilized as particles of suitable size so that they will be fluidized along with the reactants and passed to a reaction zone from which the catalyst is continuously separated from the reaction products. In any case, as hereinabove set forth, the catalyst may be activated if desired by the utilization therewith of a hydrogen halide such as hydrogen chloride or hydrogen bromide. In another embodiment, the hydrogen halide may be introduced in the form of a suitable organic compound such as an alkyl halide from which the hydrogen halide is formed under the reaction conditions. Examples of such alkyl halides include propyl chlorides, butyl chlorides, amyl chlorides, propyl bromides, butyl bromides, amyl bromides, etc. Also, it is within the generally broad scope of the present invention to utilize a hydrogen halide promoter continuously or intermittently as may be desired in any particular case.

Regardless of the particular operation employed, the products are fractionated or otherwise separated to recover the desired products, and to separate unconverted material for recycling. Hydrogen halide, if present in the reaction zone effluent, likewise is separated and may be recycled as desired.

The following examples are introduced to illustrate further the novelty and utility of the present invention but with no intention of unduly limiting the same.

EXAMPLE I

A platinum-alumina composite was prepared by the general method of dissolving aluminum pellets in hydrochloric acid to form a sol containing about 15% aluminum. Hydrofluoric acid was added to the sol so that the final composite contained 0.35% fluorine by weight based on dry alumina. The resulting solution was mixed with hexamethylene tetraamine in a continuous mixer and dropped into an oil bath at about 90° C. to form spheres. The spheres were aged in the oil, and then in an aqueous solution of ammonia (1–2 hours). The washed spheres were then transferred to a dryer, dried at about 250° C., and calcined at about 600° C. These synthetically prepared alumina spheres were impregnated with a dilute ammoniacal solution of chloroplatinic acid. The amount of platinum in this solution was adjusted so that the final composite contained 0.375% platinum by weight based on dry alumina. The thus impregnated composite was calcined in air at a temperature of about 500° C. A sufficient quantity of this alumina was prepared so that it could be used in the preparation of various further composites.

A 50 cc. quantity of the above-prepared composite was placed as a fixed bed in a reaction tube and tested for activity for the isomerization of n-butane to isobutane. Conditions utilized included a pressure of 300 p.s.i.g., a hydrogen to hydrocarbon ratio of 0.5, an hourly liquid space velocity of 1.0, and various temperatures. This composite is virtually inactive for the isomerization of n-butane to isobutane during two hour test periods at temperatures of 150° C., 200° C., 250° C., 300° C., and 350° C. At about 400° C., about 1.5% isobutane appears in the product. Temperatures must be raised to about 470° C. before equilibrium quantities of isobutane are observed in the product. At this temperature the product contains about 35% isobutane and about 65% n-butane. The reaction is exceedingly temperature sensitive with side reactions including cracking and disproportionation taking over very rapidly within about a 10° C. temperature spread.

EXAMPLE II

Seventy grams of platinum-alumina composite prepared as described hereinabove were reduced in hydrogen for two hours at 600° C. and then placed in a glass liner in a rotating autoclave along with 52 grams of anhydrous aluminum chloride. The autoclave was sealed, pressured with 25 p.s.i. of hydrogen, and heated and rotated for two hours at 250° C. The autoclave was allowed to cool overnight, depressured through a caustic scrubber, opened, and the final composite removed therefrom. Weighing of this composite indicated that it had gained 18.5% in weight, equivalent to the aluminum chloride sublimed thereon and reacted therewith. The caustic scrubber was found to have absorbed hydrogen chloride equivalent to 5.2 weight percent of the platinum-alumina composite, corresponding to 0.8 mol of HCl per mol of AlCl₃ adsorbed. Samples of this thus prepared catalyst were utilized for the isomerization of n-butane, n-pentane, and n-hexane. Fifty cc. of the catalyst was tested for the isomerization of n-butane under the same conditions described hereinabove in Example I, that is, 300 p.s.i.g. 0.5 hydrogen to hydrocarbon ratio, 1 LHSV, and at various temperatures. The results obtained are presented in the following table:

*Table I*

ISOMERIZATION OF n-BUTANE IN THE PRESENCE OF 19% ALUMINUM CHLORIDE REACTED WITH 0.375% PLATINUM ON ALUMINA

| Run No | 1 | 2 | 3 | 4 | 5 | 6 |
|---|---|---|---|---|---|---|
| Temperature, °C | 126 | 148 | 176 | 200 | 226 | 251 |
| Product, wt. percent: | | | | | | |
| Isobutane | 0.7 | 2.6 | 12.2 | 24.6 | 43.3 | 44.1 |
| n-Butane | 99.3 | 97.4 | 87.8 | 75.0 | 53.9 | 46.3 |
| C₁–C₃ | 0 | 0 | 0 | 0.4 | 2.8 | 9.6 |

From these results it is obvious that the composition was a particularly effective isomerization catalyst. Isomerization was achieved in the absence of substantial amounts of cracking without the utilization of added hydrogen chloride. Furthermore, this isomerization was achieved at relatively low temperatures. At such low temperatures, equilibrium favors the formation of larger quantities of isobutane per pass than at higher temperatures. For example, at 226° C., the equilibrium quantities are 46% isobutane and 54% n-butane. These values were achieved in run No. 5 with a very small amount of cracking. In contrast to the data described in Example I, there is obtained here about 10% more isobutane per pass merely by being able to operate at the lower temperature. This lower temperature also results in considerable heat savings in the commercial utilization of this process.

EXAMPLE III

Another 50 cc. sample of the alumina-platinum-aluminum chloride composite prepared as described in Example II was utilized for the isomerization of n-pentane to isopentane. The isomerization of n-pentane was studied at 300 p.s.i.g., 1 LHSV, 1.3 hydrogen to hydrocarbon ratio, and at various temperatures. The results obtained are presented in the following table:

*Table II*

ISOMERIZATION OF n-PENTANE IN THE PRESENCE OF 19% ALUMINUM CHLORIDE REACTED WITH 0.375% PLATINUM ON ALUMINA

| Run No | 7 | 8 | 9 | 10 | 11 | 12 |
|---|---|---|---|---|---|---|
| Temperature, °C | 125 | 151 | 177 | 199 | 223 | 250 |
| Product, wt. percent: | | | | | | |
| Isopentane | 19.4 | 36.7 | 65.4 | 58.7 | 50.5 | 34.9 |
| n-Pentane | 75.8 | 62.4 | 30.1 | 28.1 | 22.8 | 16.2 |
| C₁–C₄ | 4.1 | 0.9 | 2.4 | 9.6 | 18.2 | 37.7 |

From the above results, it is readily apparent that this composition is an effective isomerization catalyst for n-pentane at relatively low temperatures. Hydrogen chloride was not utilized in these experiments. Isomerization of n-pentane took place readily and equilibrium values were approached rapidly. Equilibrium was just about attained at 177° C. at which temperature cracking was very low. Higher temperatures resulted in an increase in cracking with a resultant loss of isopentane from the product.

EXAMPLE IV

Another catalyst which increased in weight by 9.3% after sublimation thereon of aluminum chloride was prepared in a manner substantially the same as described in Example II. Seventy grams of the base composite, prepared as described in Example I, were placed in a glass autoclave liner along with 14 grams of anhydrous aluminum chloride. The autoclave was closed, pressured of 25 lbs. with hydrogen, and heated and rotated at 250° C. for a two-hour period. The autoclave was allowed to cool overnight. The composite containing about 9.3% aluminum chloride impregnated thereon was removed, and the amount of hydrogen chloride liberated during impregnation measured and found to correspond to about 0.9 mol per mol of $AlCl_3$ adsorbed.

Fifty cc. of the above-described composite were utilized for the isomerization of n-pentane at 300 p.s.i.g., 1.0 LHSV, 1.3 hydrogen to hydrocarbon ratio, and at varying temperatures. The results obtained are presented in the following table:

Table III

ISOMERIZATION OF n-PENTANE IN THE PRESENCE OF 9% ALUMINUM CHLORIDE REACTED WITH 0.375% PLATINUM ON ALUMINA

| Run No. | 13 | 14 | 15 |
|---|---|---|---|
| Temperature, ° C. | 200 | 250 | 300 |
| Product, wt. percent: | | | |
| Isopentane | 52.6 | 58.3 | 47.1 |
| n-Pentane | 46.5 | 40.5 | 32.3 |
| $C_1$-$C_4$ | 0.9 | 1.2 | 20.6 |

These results illustrate again an effective isomerization catalyst. No hydrogen chloride addition was utilized. Equilibrium percentages of isopentane in the product were obtained at about 250° C. with negligible side reactions.

EXAMPLE V

This example was carried out to illustrate the beneficial effect of the platinum in combination with an alumina base and with aluminum chloride impregnated thereon and reacted therewith. In this example the support for the aluminum chloride was alumina spheres prepared substantially as described in Example I except that no chloroplatinic acid was composited therewith and thus the catalyst contained no platinum.

Seventy grams of these platinum-free alumina spheres along with 14 grams of anhydrous aluminum chloride were placed in a glass autoclave liner. The autoclave was sealed, 25 p.s.i. of hydrogen was added, and the autoclave was heated and rotated for two hours at 250° C. The autoclave was allowed to stand overnight, and after opening, the composite was found to have increased 11.3% in weight, indicating an aluminum chloride pickup equivalent to the above indicated percentage of 11.3.

Fifty cc. of this composite were tested for activity for the isomerization of n-pentane. These tests were carried out at 300 p.s.i., 1.0 LHSV, 1.3 hydrogen to hydrocarbon ratio, and at various temperatures. The results obtained are presented in the following table:

Table IV

ISOMERIZATION OF n-PENTANE IN THE PRESENCE OF 11.3% ALUMINUM CHLORIDE ON ALUMINA

| Run No. | 16 | 17 | 18 | 19 |
|---|---|---|---|---|
| Temperature, ° C. | 150 | 200 | 250 | 300 |
| Product, wt. percent: | | | | |
| Isopentane | 0 | 4.7 | 15.0 | 10.9 |
| n-Pentane | 0 | 93.5 | 82.6 | 86.7 |
| $C_1$-$C_4$ | 0 | 1.8 | 2.4 | 2.4 |

These results should be compared with those obtained in Example IV. Without the beneficial effect of the platinum component of the novel composition of matter of the present invention, substantially less isomerization was observed. While the composite of the present example may be active at higher temperatures and/or in the presence of added hydrogen chloride, it is certainly not equivalent to the similar catalyst containing platinum, as shown by the results described hereinabove. In view of the results described herein, and in view of the results described in Example I wherein platinum-alumina composite was tested, it is readily obvious that more than an additive effect is obtained by utilization of the novel composition of matter comprising platinum, alumina, and $>Al-O-AlCl_2$ active centers.

EXAMPLE VI

This example illustrates the utilization of the novel compositions of matter of the present invention for the isomerization of n-hexane. In this example the same sample of catalyst was utilized as that described in Example III for the isomerization of n-pentane. This study of the isomerization of n-hexane was carried out at 300 p.s.i, 1.0 LHSV, 3.0 hydrogen to hydrocarbon ratio, and at varying temperatures. The results obtained are presented in the following table:

Table V

ISOMERIZATION OF n-HEXANE IN THE PRESENCE OF 19% ALUMINUM CHLORIDE REACTED WITH 0.375% PLATINUM ON ALUMINA

| Run No. | 20 | 21 | 22 | 23 | 24 |
|---|---|---|---|---|---|
| Temperature, ° C. | 125 | 150 | 174 | 199 | 224 |
| Product, wt. percent: | | | | | |
| Isohexanes | 22.0 | 30.2 | 54.5 | 62.9 | 60.1 |
| n-Hexane | 74.3 | 66.4 | 41.0 | 32.7 | 33.6 |
| $C_1$-$C_5$ | 2.3 | 1.8 | 1.2 | 2.7 | 4.9 |

Although the quantities of isomers obtained do not reach equilibrium within this temperature range and space velocity, this is due to the slower reactions involving the formation of 2,2- and 2,3-dimethylbutane. The novel composition of matter again demonstrates its utility as a powerful isomerization catalyst within the temperature ranges explored, even in the absence of hydrogen chloride.

EXAMPLE VII

This example illustrates further the utilization of the novel compositions of matter of the present invention for the isomerization of n-butane. This example shows the high activity of the present compositions of matter prepared under conditions assuring the substantial absence of free aluminum chloride in the catalyst composition. The catalyst utilized in this example was prepared in a manner substantially the same as that described in Example II. Two hundred and seventy-one grams of platinum-alumina composite prepared as described in Example I were reduced in hydrogen for two hours at 600° C. and then were placed in a glass liner in a rotating autoclave along with 110 grams of aluminum chloride. The autoclave was sealed, pressured with 25 p.s.i. of hydrogen, and heated and rotated for two hours at 250° C. At the end of this two hour period, the autoclave was immersed in water to assure rapid cooling. The pressure from the autoclave was vented through a caustic scrubber in which the hydrogen chloride evolved was collected. The amount of hydrogen chloride which was evolved was determined by back titration of the measured amount of caustic which had been placed in the scrubber. This amount was determined as 14 grams of chloride ion, or 0.394 equivalent of chloride. Since this chloride ion was evolved as hydrogen chloride, the number of free hydroxyl groups on the surface of the alumina must have been about 0.15 equivalent per hundred grams. After the autoclave was opened, the total composite free from excess aluminum chloride weighed 317 grams giving a weight increase of 17 grams per hundred grams of starting material. This 17 grams is equal to 0.17 equivalent assuming that the gain in weight is due to the formation of >Al—O—AlCl$_2$ centers. Thus, the equivalents of hydrogen chloride evolved and the equivalents of new active centers formed check very closely.

A sample of the above-described composite, 58.5 grams, was placed in a glass tube surrounded by a horizontal furnace and heated to 600° F. This is far above the sublimation temperature of aluminum chloride, namely, 183° C. or 361.4° F. The composite was maintained at this temperature for 17 hours during which time it lost 2.17 grams of chloride, determined as hydrogen chloride. The composite was then raised to a temperature of 1000° F. at which time it again lost chloride, determined as hydrogen chloride, in amount of 0.84 gram. The total net weight gain as a result of these several steps was about 12 grams per hundred of original platinum-alumina composite.

The catalyst as thus prepared was then utilized for the isomerization of n-butane at 300 p.s.i.g., 0.5 hydrogen to hydrocarbon ratio, 1.0 LHSV, and at various temperatures. The results obtained are presented in the following table:

*Table VI*

ISOMERIZATION OF n-BUTANE IN THE PRESENCE OF CALCINED 12% ALUMINUM CHLORIDE ON ALUMINA CONTAINING 0.375% PLATINUM

| Run No. | 25 | 26 | 27 |
|---|---|---|---|
| Temperature, °C | 150 | 175 | 200 |
| Product, wt. percent: | | | |
| Isobutane | 28 | 48 | 57 |
| n-Butane | 71 | 51 | 42 |
| C$_1$–C$_3$ | 1 | 1 | 1 |

It is readily apparent from the above data that this catalyst is extremely active yielding equilibrium conversion of n-butane to isobutane at 200° C. with only about 1% of side reactions. This again has been carried out in the absence of added hydrogen chloride. This experiment illustrates fully the absence of free aluminum chloride and the beneficial effect obtained by the present multicomponent catalyst composition of matter.

We claim as our invention:

1. As a new composition of matter, a calcined and reduced composite of a refractory oxide containing chemically combined hydroxyl groups and from about 0.01% to about 2% by weight of a platinum group metal, said calcined composite being impregnated with from about 10% to about 100% by weight of an anhydrous Friedel-Crafts metal halide in which the halogen is selected from the group consisting of chlorine and bromine and said hydroxyl groups having been reacted with the metal halide in a reaction resulting in the elimination from the composite of at least 0.5 mol but not more than 2.0 mols of hydrogen halide per mol of Friedel-Crafts metal halide adsorbed thereon.

2. As a new composition of matter, a calcined and reduced composite of a refractory metal oxide containing chemically combined hydroxyl groups and from about 0.01% to about 2% by weight of platinum, said calcined composite being impregnated with from about 10% to about 100% by weight of an anhydrous Friedel-Crafts metal halide in which the halogen is selected from the group consisting of chlorine and bromine and said hydroxyl groups having been reacted with the metal halide in a reaction resulting in the elimination from the composite of at least 0.5 mol but not more than 2.0 mols of hydrogen halide per mol of Friedel-Crafts metal halide adsorbed thereon.

3. The composition of claim 2 further characterized in that said metal halide is ferric chloride.

4. The composition of claim 2 further characterized in that said metal halide is ferric bromide.

5. The composition of claim 2 further characterized in that said metal halide is stannic chloride.

6. As a new composition of matter, a calcined and reduced composite of a refractory oxide containing chemically combined hydroxyl groups and from about 0.01% to about 2% by weight of platinum, said calcined composite being impregnated with from about 10% to about 100% by weight of anhydrous aluminum bromide and said hydroxyl groups having been reacted with the aluminum chloride in a reaction resulting in the elimination from the composite of at least 0.5 mol but not more than 2.0 mols of hydrogen chloride per mol of aluminum chloride.

7. As a new composition of matter, a calcined and reduced composite of a refractory oxide containing chemically combined hydroxyl groups and from about 0.01% to about 2% by weight of platinum, said calcined composite being impregnated with from about 10% to about 100% by weight of anhydrous aluminum bromide and said hydroxyl groups having been reacted with the aluminum bromide in a reaction resulting in the elimination from the composite of at least 0.5 mol but not more than 2.0 mols of hydrogen bromide per mol of aluminum bromide.

8. As a new composition of matter, a calcined and reduced composite of alumina containing chemically combined hydroxyl groups and from about 0.01% to about 2% by weight of platinum, said calcined composite being impregnated with from about 10% to about 100% by weight of an anhydrous Friedel-Crafts metal halide in which the halogen is selected from the group consisting of chlorine and bromine and said hydroxyl groups having been reacted with the metal halide in a reaction resulting in the elimination from the composite of at least 0.5 mol but not more than 2.0 mols of hydrogen halide per mol of Friedel-Crafts metal halide adsorbed thereon.

9. The composition of claim 8 further characterized in that said metal halide is aluminum bromide.

10. As a new composition of matter, a calcined and reduced composite of a refractory oxide and from about 0.01% to about 2% by weight of a platinum group metal, said calcined composite being impregnated with from about 10% to about 100% by weight of an anhydrous Friedel-Crafts metal halide in which the halogen is selected from the group consisting of chlorine and bromine, said refractory oxide normally containing chemically combined hydroxyl groups which have been reacted with the metal halide with the resultant elimination of about 1.0 mol of hydrogen halide per mol of metal halide and with the formation of —Re—O—MeX$_{v-1}$ active centers, wherein Re represents the element of the refractory oxide, Me represents the metal of the Friedel-Crafts metal halide, X represents a halogen selected from the group consisting of chlorine and bromine, and $v$ represents the valence of Me.

11. As a new composition of matter, a calcined and reduced composite of a refractory metal oxide and from about 0.01% to about 2% by weight of platinum, said calcined composite being impregnated with from about 10% to about 100% by weight of an anhydrous Friedel-Crafts metal halide in which the halogen is selected from the group consisting of chlorine and bromine, said metal oxide normally containing chemically combined hydroxyl groups which have been reacted with the metal halide with the resultant elimination of about 1.0 mol of hydrogen halide per mol of metal halide and with the formation of —Re—O—MeX$_{v-1}$ active centers, wherein Re represents the metal of the refractory oxide, Me represents the metal of the Friedel-Crafts metal halide, X represents a halogen selected from the group consisting of chlorine and bromine, and v represents the valence of Me.

12. As a new composition of matter, a calcined and reduced composite of a refractory metal oxide and from about 0.01% to about 2% by weight of platinum, said calcined composite being impregnated with from about 10% to about 100% by weight of an anhydrous aluminum halide in which the halogen is selected from the group consisting of chlorine and bromine, said refractory oxide normally containing chemically combined hydroxyl groups which have been reacted with the aluminum halide with the resultant elimination of about 1.0 mol of hydrogen halide per mol of aluminum halide and with the formation of —Re—O—AlX$_2$ active centers, wherein Re represents the metal of the refractory oxide and X represents said halogen.

13. As a new composition of matter, a calcined and reduced composite of alumina normally containing chemically combined hydroxyl groups and from about 0.01% to about 2% by weight of platinum, said calcined composite being impregnated with from about 10% to about 100% by weight of anhydrous aluminum chloride and said hydroxyl groups having been reacted with the aluminum chloride with the resultant elimination of about 1.0 mol of hydrogen chloride per mol of aluminum chloride and with the formation of >Al—O—AlCl$_2$ active centers.

14. As a new composition of matter, a calcined and reduced composite of alumina containing chemically combined hydroxyl groups and from about 0.01% to about 2% by weight of platinum, said calcined composite being impregnated with from about 10% to about 100% by weight of anhydrous aluminum chloride and said hydroxyl groups having been reacted with the aluminum chloride in a reaction resulting in the elimination from the composite of at least 0.5 mol but not more than 2.0 mols of hydrogen chloride per mol of aluminum chloride adsorbed thereon.

References Cited in the file of this patent

UNITED STATES PATENTS

| | | |
|---|---|---|
| 2,277,512 | De Simo | Mar. 24, 1942 |
| 2,311,713 | Thomas et al. | Feb. 23, 1943 |
| 2,406,477 | Solomon | Aug. 27, 1946 |
| 2,415,061 | De Simo | Jan. 28, 1947 |
| 2,478,916 | Haensel et al. | Aug. 16, 1949 |
| 2,635,080 | Appell | Apr. 14, 1953 |
| 2,704,281 | Appell | Mar. 15, 1955 |
| 2,746,937 | Hunter et al. | May 22, 1956 |
| 2,762,781 | Nozaki et al. | Sept. 11, 1956 |
| 2,840,527 | Brennan et al. | June 24, 1958 |